United States Patent [19]
Pendleton

[11] 3,864,070
[45] Feb. 4, 1975

[54] ADJUSTABLE DOUGHNUT MACHINE

[76] Inventor: Leland W. Pendleton, 1343 Folsom Ave., San Pablo, Calif. 94806

[22] Filed: Sept. 15, 1972

[21] Appl. No.: 289,421

[52] U.S. Cl. .............................................. 425/287
[51] Int. Cl. .......................................... A22c 11/18
[58] Field of Search ............. 425/287, 288; 222/309

[56] References Cited
UNITED STATES PATENTS

| | | | |
|---|---|---|---|
| 1,447,166 | 3/1923 | Alumbaugh.......................... | 425/287 |
| 1,776,780 | 9/1930 | Carpenter............................ | 425/288 |
| 2,023,658 | 12/1935 | Ahacich................................ | 425/287 |
| 3,663,144 | 5/1972 | Pendleton et al.................... | 425/287 |

*Primary Examiner*—J. Spencer Overholser
*Assistant Examiner*—David S. Safran
*Attorney, Agent, or Firm*—Limbach, Limbach & Sutton

[57] ABSTRACT

An improved adjustment mechanism to vary the size of doughnuts formed in a doughnut machine having a dough hopper with a throat in which a pair of cooperating plungers operate in coordinated cycles to extrude uniform doughnuts is described. The adjustment mechanism is mounted on a shaft connected to the upper of the two axially aligned plungers and includes a vertically adjustable bushing threadably connected to the shaft, a slidable collar positioned above the bushing, and, cooperating structural means connecting the collar to the bushing for permitting limited vertical displacement of the collar relative to the bushing when a spring is compressed and permitting the bushing to be rotated for threading on the shaft. An actuating arm is connected to the collar and imparts a predetermined motion cycle to the collar which is transmitted to the upper plunger through the adjustment means thereby permitting the stroke of the plunger to be varied by the bushing and buffered by the compression spring.

2 Claims, 7 Drawing Figures

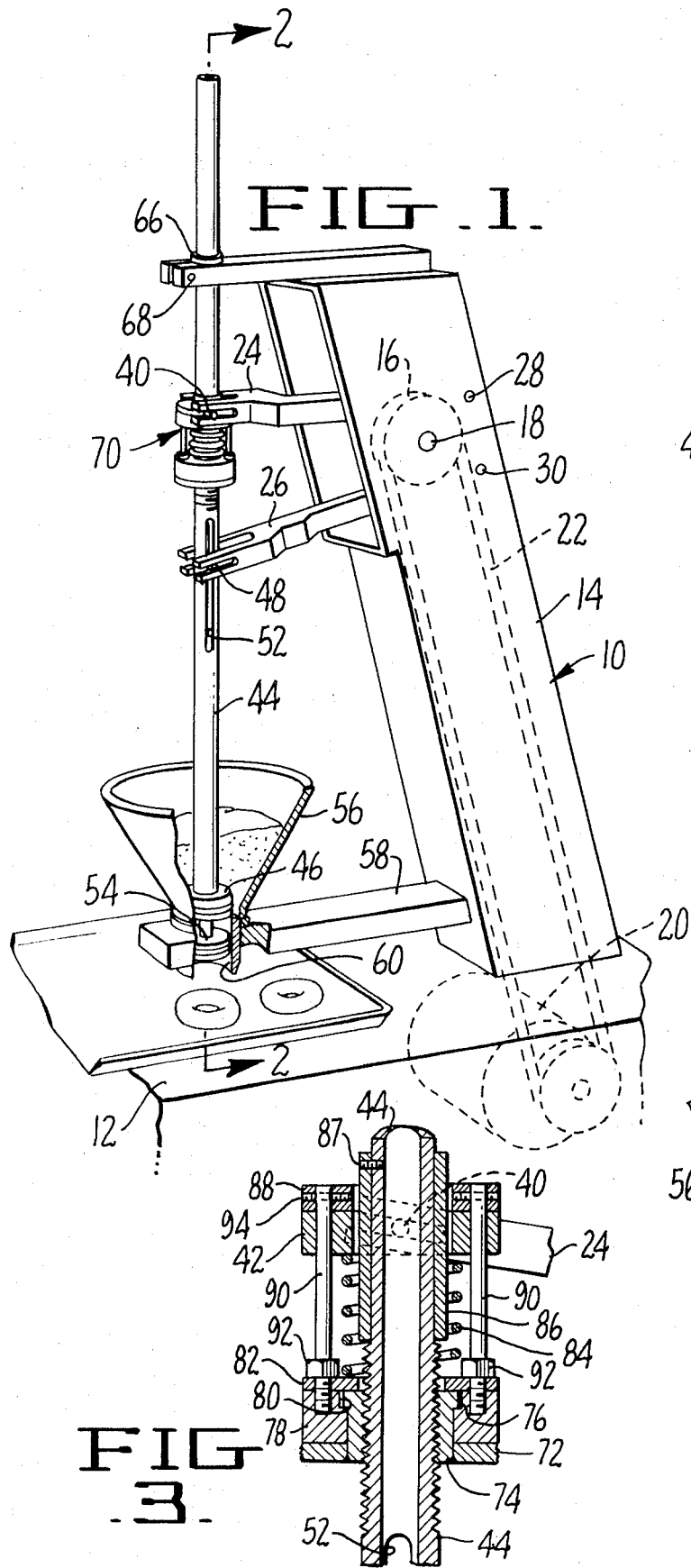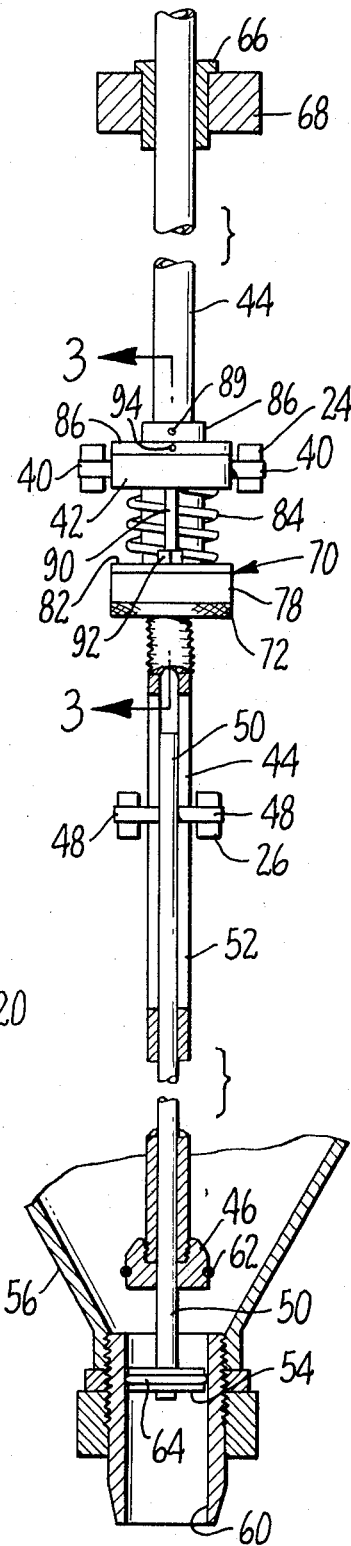

3,864,070

ADJUSTABLE DOUGHNUT MACHINE

BACKGROUND OF THE INVENTION

This invention relates to a dough dispensing machine having a discharge volume varying means with adjustment in a relatively moving actuator. More specifically this invention relates to an improvement in adjustment means in a doughnut making machine for varying the size of the doughnuts dispensed. Doughnut making machines having a dough hopper with a depending throat in which a pair of cooperating plungers operate in coordinated cycles to automatically or semi-automatically dispense batches of uniform doughnuts are old in the art.

However, because batches of dough are not always consistent it is desirable to have an adjustment means on the doughnut forming machine which can vary the coordinated operation of the plungers to produce a relatively consistent product. Furthermore, when the size of the doughnut is desired to be varied, it is necessary that the machine have adjustment means to provide the desired variation.

A common method of actuating the two plungers has been by use of two cams each controlling an actuating arm connected to one of the plungers by a connecting shaft. In these devices adjustment means have generally been applied to the cams, by advancing one cam relative to the other, or to the actuating arms, by displacing the pivot point of one arm relative to the other. These means affect the relative timing of the operating cycles which is to be avoided for optimum operating effectiveness and are more complex to effect than necessary.

As a consequence in the use of an adjustment means, it has been discovered that a buffering means is required to absorb the operating shock in forming an increased charge of dough in the throat of the dough hopper. Since dough is relatively incompressible, small variations in the amount of the charge can produce a compression shock that is transmitted throughout the drive mechanism. It is therefore desirable to provide means to absorb this shock and generally provide for the smooth operation of the machine by absorbing any tolerance and timing inconsistencies when variations are made to the size of the doughnuts produced.

The improved adjustment mechanism of this invention provides both a simple means of varying the size of doughnuts dispensed and an effective means of absorbing compression shock enabling a high speed operation of the machine.

SUMMARY OF THE INVENTION

The improved adjustment mechanism of this invention enables the size of doughnuts formed in a doughnut machine to be varied. The adjustment mechanism can be adapted to a doughnut machine having a pair of cooperating plungers which operate in coordinated cycles in a dependent throat of a dough hopper.

The adjustment mechanism is attached to a shaft connected to the upper of the two axially aligned plungers and includes a bushing which is threaded to the shaft and vertically adjustable thereon. A sleeve is arranged concentrically around the bushing and is free to rotate thereon. The sleeve is so constructed and arranged that it is restricted from vertical movement with respect to the bushing. An annular collar is arranged above the bushing and separated therefrom by a spring. The collar is limited in vertical movement by a annular cap which is displaced from and connected to the sleeve on the bushing by elongated pins. The collar is therefore free to move between the cap and bushing by compression of the spring.

An actuating mechanism is connected to the collar for operation of the plunger. While the actuating mechanism may be of differing design which can produce a controlled reciprocating cycle, it is preferred that a cam operated actuating arm be connected to the collar.

In operation the adjustment mechanism permits the upper plunger to operate in its cycle at a higher or lower relative position. Since it is the distance that the upper plunger is inserted in the throat that controls the amount of dough dispensed, lowering the shaft with respect to the adjustment mechanism will increase the amount dispensed. However, since the lower plunger is not changed in operating cycle, a means is required to absorb an increased charge of dough forced into the throat of the hopper by the upper plunger before the lower plunger releases the dough from the throat. It is primarily for this purpose that a compression spring is included in the drive mechanism on the downward stroke of the upper plunger. Any shock caused by the compression of the increased charge of dough is absorbed by the compression spring. In addition the compression spring provides for the smooth operation of the machine enabling a machine as disclosed in the description of the preferred embodiment to form doughnuts at the high rate of 200 dozen per hour.

BRIEF DESCRIPTION OF THE DRAWINGS

FIG. 1 is a perspective view of a doughnut machine.

FIG. 2 is a sectional view of a dispensing mechanism taken on the lines 2—2 in FIG. 1.

FIG. 3 is an enlarged sectional view of an adjustment mechanism taken on the lines 3—3 in FIG. 2.

DETAILED DESCRIPTION OF THE PREFERRED EMBODIMENT

Figure 4:
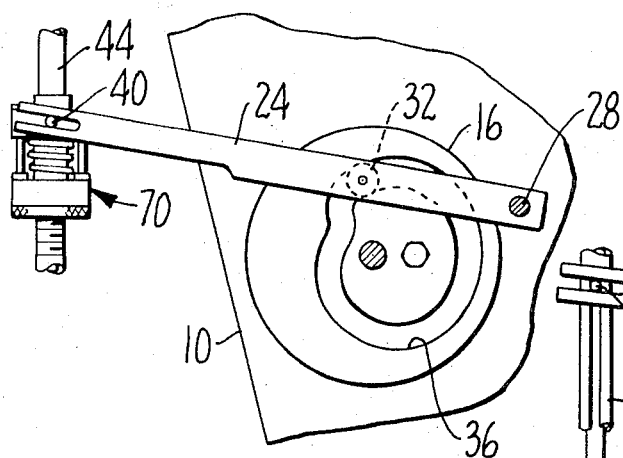
FIg. 4 is a schematic view of an actuating mechanism for a first plunger of the doughnut machine of FIG. 1.
Figure 5:
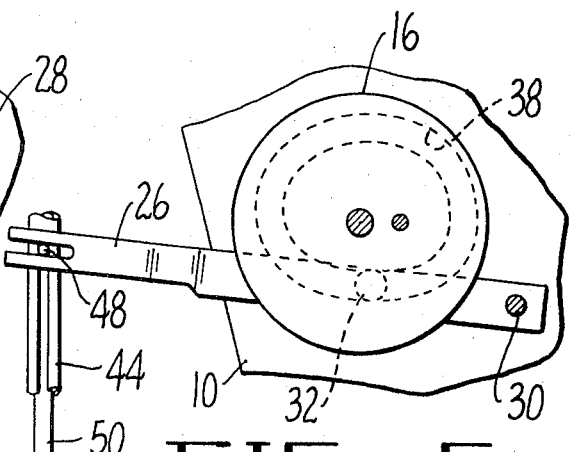
FIG. 5 is a schematic view of an actuating mechanism for a second plunger of the doughnut machine of FIG. 1.
Figure 6:
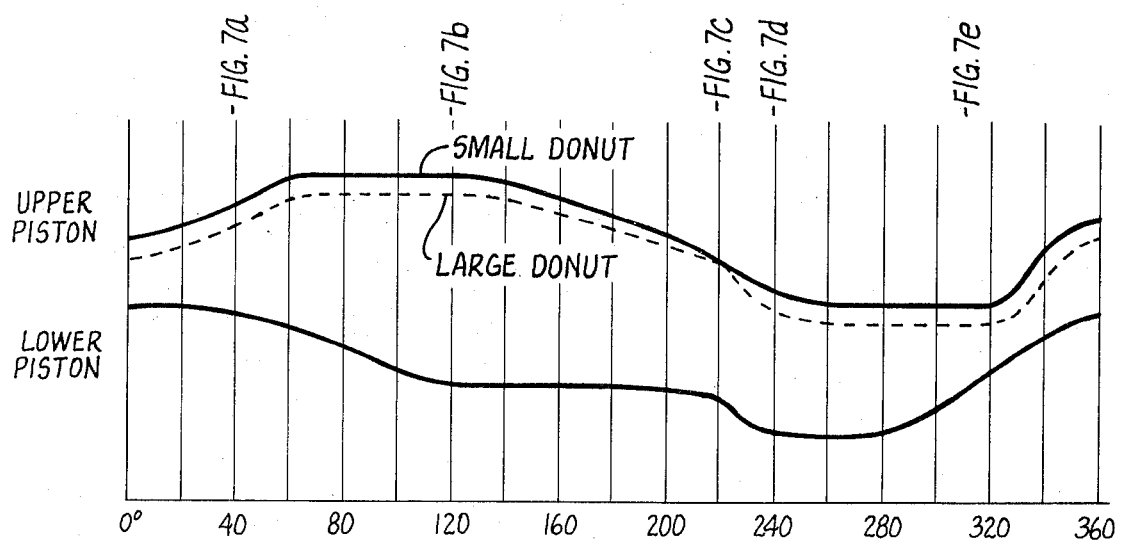
FIG. 6 is a diagrammatic illustration of the respective plunger displacements.
Figure 7:
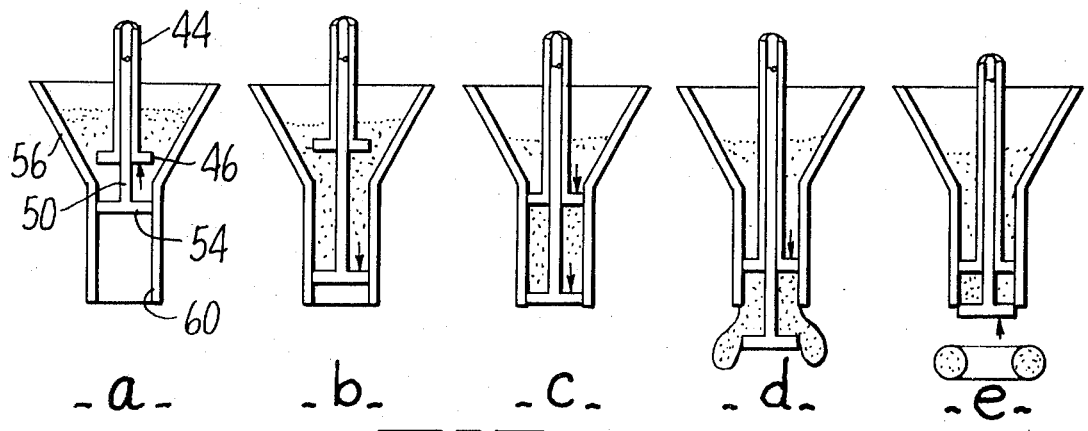
FIG. 7 is a schematic illustration of the respective plunger displacements corollated to the diagrammatic illustration of FIG. 6.

Referring to FIG. 1 a doughnut machine 10 is shown having a platform 12 on which a tray or the like for receiving formed doughnuts may be supported. Above the platform is a structural column 14 in which is contained the actuating mechanism. The actuating mechanism includes a dual drive cam 16 mounted on an axel 18 in column 14 and connected to a variable speed electrical motor 20 by a chain drive 22, shown in phantom in FIG. 1. The actuating mechanism also includes an upper actuating arm 24 and a lower actuating arm 26 which are connected by pivot axels 28 and 30 to the support column 14. The actuating arms 24 and 26 are operated by a tracking roller, 32 and 34, respectively, in the middle of each arm which follows a guide track, 36 and 38, respectively, on each side of the dual drive cam 16 is schematically illustrated in FIGS. 4 and 5.

The free end of each of the actuating arms is bifurcated and slotted to engage a slide pin. As shown in The above description of my preferred embodiment is not intended to limit my invention which is defined by the claims. For example, by simply extending the discharge throat such that the lower piston does not project below the end of the throat, and providing a side orifice in the extension, the doughnut machine and adjustment mechanism can be adapted to discharge uniform quantities of dough for a variety of uses not limited to doughnuts.

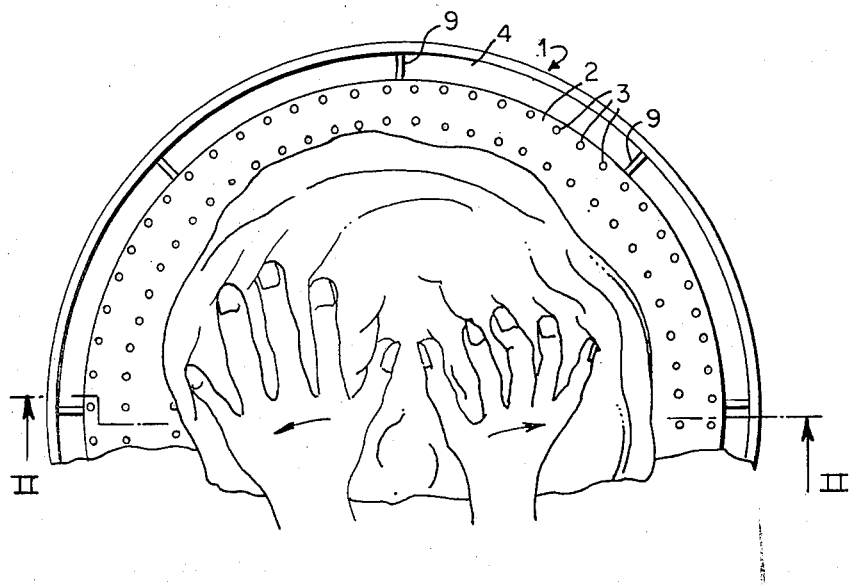

I claim:

1. In a doughnut dispensing machine having a dough hopper with a discharge throat, an upper plunger and a lower plunger arranged on a common axis and operable in said throat in a predetermined coordinated cycle to dispense doughnuts from the discharge throat, a first vertical member connected to said upper plunger and a second vertical member connected to said lower plunger, and actuating means operably connected to each of said connecting members for cycling each of said plungers; the improvement comprising an adjustment mechanism for varying the discharge of doughnuts which comprises:

a bushing threadably connected to said first vertical member and arranged for adjustable vertical displacement relative thereto, an annular sleeve so constructed and arranged on said bushing that vertical displacement relative to said bushing is prevented and rotational movement relative to said bushing is permitted, a collar arranged above said bushing and slidable on said first vertical member, a compression spring arranged between said collar and said bushing, an annular cap arranged above said collar and connected to said annular sleeve with elongated connecting pins and so constructed and arranged that said collar is restricted in vertical movement except by compression of said spring, and, means operably connecting said collar to the actuating mechanism.

2. In a doughnut dispensing machine having a dough hopper with a discharge throat, an upper plunger and a lower plunger arranged on a common axis and operable in said throat in a predetermined coordinated cycle to dispense doughnuts from the discharge throat, a first vertical member connected to said upper plunger and a second vertical member connected to said lower plunger, and actuating means operably connected to each of said connecting members for cycling each of said plungers; the improvement comprising an adjustment mechanism for varying the discharge of doughnuts which comprises:

a bushing threadably connected to said first vertical member and arranged for adjustable vertical displacement relative thereto, an annular sleeve so constructed and arranged on said bushing that vertical displacement relative to said bushing is prevented and rotational movement relative to said bushing is permitted, a collar arranged above said bushing and slidable on said first vertical member, a compression spring arranged between said collar and said bushing, an annular cap arranged above said collar and connected to said annular sleeve in a manner that said collar is restricted in vertical movement except by compression of said spring, and means operably connecting said collar to the actuating mechanism.

* * * * *

United States Patent [19]

La Monica

[11] 3,864,071

[45] Feb. 4, 1975

[54] PIZZA PIE MAKING APPARATUS AND METHOD

[76] Inventor: Luigi La Monica, 1533 85th St., Brooklyn, N.Y. 11228

[22] Filed: Apr. 3, 1973

[21] Appl. No.: 347,476

[52] U.S. Cl. .................. 425/470, D7/43, 249/176
[51] Int. Cl. .............................. A21c 11/12
[58] Field of Search ........... 425/470, 458; 249/176, 249/DIG. 1; D7/43, 85

[56] References Cited
UNITED STATES PATENTS

| | | | |
|---|---|---|---|
| 2,174,425 | 9/1939 | Schlumbohm | 249/DIG. 1 |
| 2,650,552 | 9/1953 | Wood | 269/302.1 X |
| 3,328,847 | 7/1967 | Trogdon | 249/176 X |
| D117,346 | 10/1939 | Brickley | D-7/43 |

Primary Examiner—Roy Lake
Assistant Examiner—DeWalden W. Jones
Attorney, Agent, or Firm—Flynn & Frishauf

[57] ABSTRACT

A pizza pie making apparatus and method wherein the apparatus has a generally flat surface for receiving pie dough thereon, and a plurality of projections extending upwardly from the flat surface, the projections being distributed over a substantial portion of the flat surfaces. The projections extend from the flat surface by an amount which is less than the thickness of the pie to be made from the dough, and engage the pie dough during the forming thereof to prevent shrinkage. Preferably, a trough is formed around the periphery of the flat surface for receiving dough therein, to thereby form the edges of the crust. Upwardly extending peripheral lips and legs are preferably provided to enable convenient stacking of the pie making devices.

19 Claims, 7 Drawing Figures